United States Patent Office 2,720,592
Patented Oct. 11, 1955

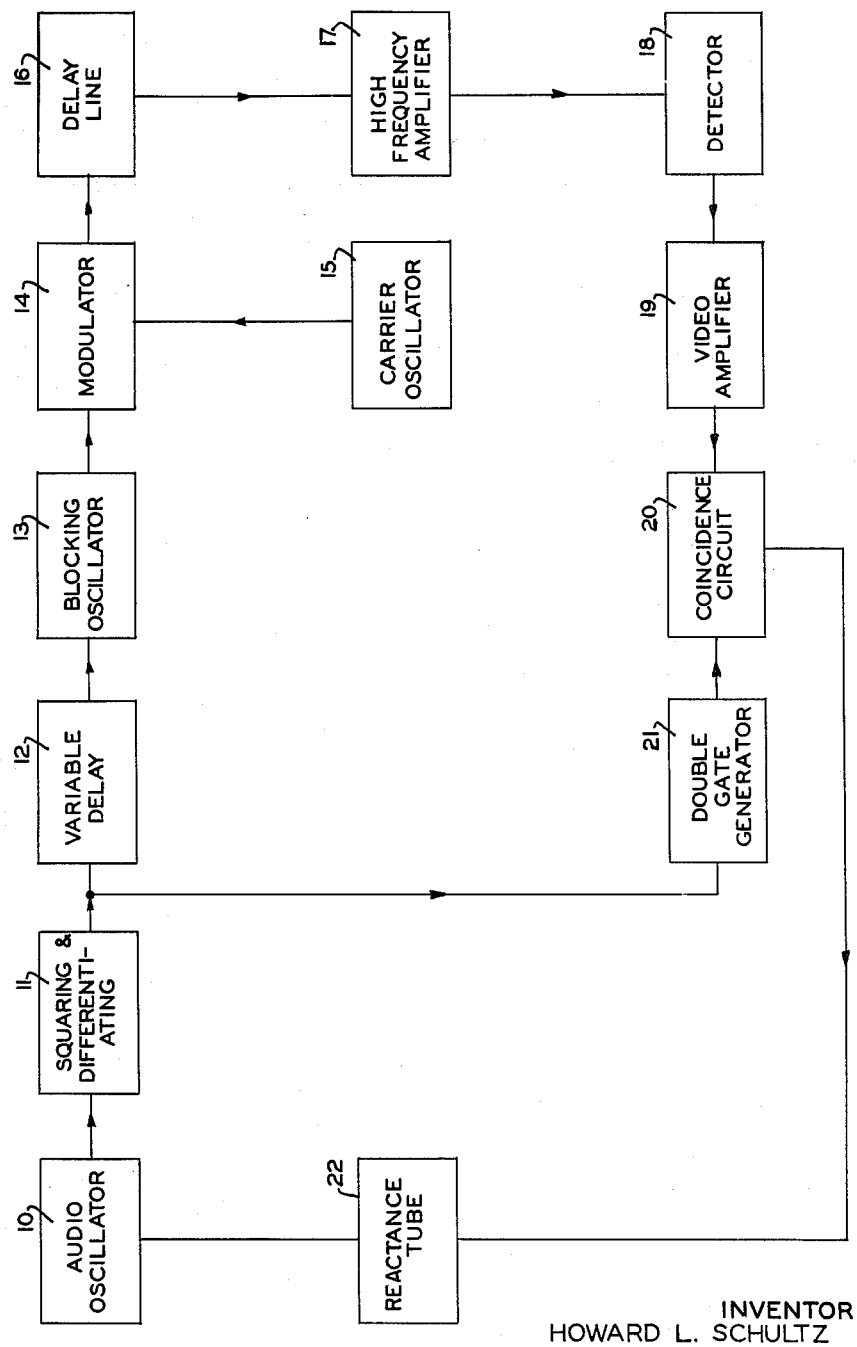

2,720,592

SELF-SYNCHRONIZATION SYSTEM

Howard L. Schultz, Wellesley, Mass., assignor, by mesne assignments, to the United States of America as represented by the Secretary of the Navy Application November 26, 1945, Serial No. 630,939

4 Claims. (Cl. 250—36)

This invention relates to self-synchronization circuits, and more particularly those incorporating a delay line.

Radar systems are frequently synchronized by a master oscillator, usually operating at an audio rate, which controls the timing of all of the component circuits. In general purpose systems it is not essential that the pulse repetition frequency remain precisely constant. However, in some radars designed for highly specialized purposes, it is desirable that the frequency of the master oscillator be very precisely controlled. An example of such a radar is a type known in the art as a "moving target indication" system.

In pulse radar the so-called permanent echoes from hills, trees, and buildings frequently prevent the perception of moving targets, even though such moving targets are within the radar line-of-sight. Permanent echoes obscure moving targets both by saturating the receiving equipment at the range of the permanent echo and by furnishing a multiplicity of irrelevant targets confusing to the operator.

By suitable means, permanent echoes might be replaced on the radar display by blind regions of no response whatsoever. A more desirable and more difficult operation is the selective elimination of ground echoes and the maintenance of maximum sensitivity to moving targets at the same radar range.

It is impractical to discriminate between fixed and moving targets on the basis of the echo information available from a single transmitted pulse. On the other hand it is possible to discover moving targets by examining the radar echo pattern at successive times for changes characteristic of such targets.

It is common procedure, then, in moving target indication systems, to compare echoes from successive operation cycles. This necessitates the delay of each echo by an amount equal to the period of the system, in order that it may be compared with its counterpart echo in the succeeding cycle. Delay lines have been developed in which high precision has been established in the delay time. Difficulties arise, however, when the pulse repetition rate does not remain constant and equal to the reciprocal of the line delay. This condition results in the second signal pattern not being laid exactly over the first one, thereby giving a false moving target indication.

It is the object of the present invention to provide a self-synchronization circuit which will cause the frequency of an oscillator to remain fixed with respect to a delay.

It is a further object of this invention to provide a circuit in which the maintained frequency is equal to the reciprocal of the delay time of a delay circuit.

These and other objects will be more apparent upon consideration of the following specification, taken in connection with the accompanying drawing, the single figure being a block diagram of an embodiment of the invention.

Referring to the drawing, an audio oscillator 10 produces sinusoidal oscillations, the frequency of which determines the pulse repetition frequency of the system. It is desirable to use a type of oscillator which has a minimum of jitter, a phase shift ocillator of the R-C type being readily adaptable to the present need. Circuit constants should be such that the oscillator will run freely at a frequency approximately equal to the reciprocal of the delay time of the delay line to be used. The sine wave from oscillator 10 is squared and differentiated in squaring and differentiating circuit 11, producing a periodic trigger. This trigger is delayed by variable delay 12, an L-C delay line being used here to adjust the system for complete cancellation, compensating for delays in amplifiers and other elements in the circuit. The delayed trigger fires a video signal generator, the present embodiment using blocking oscillator 13, thereby producing a video pulse which, in the particular example shown, had a width of the order of two microseconds. This video pulse is applied to modulator 14. Carrier oscillator 15, nominally operating at a frequency of 10 to 15 megacycles, also has its continuous wave output applied to modulator 14. The resulting output of modulator 14 is a test signal comprising a high frequency carrier and a video modulating envelope. This test signal is injected into delay line 16. Any known type of precision delay circuit may be herein incorporated, the type used in the present embodiment consisting essentially of a tube of mercury with a crystal at each end. The crystal at the input end is termed a transmitting crystal, its function being to convert the test signal to ultra-sonic energy. The crystal at the output end is termed a receiving crystal, its function being to convert the ultra-sonic energy back to electrical energy. The delayed test signal is amplified in high frequency amplifier 17, converted to a video signal in detector 18, further amplified in video amplifier 19, and fed to coincidence circuit 20.

The periodic trigger at the output of squaring and differenciating circuit 11 is also used to fire double-gate generator 21, the two closely-spaced gates therein produced being fed to coincidence circuit 20 along with the pulse out of video amplifier 19. The coincidence circuit develops a direct error voltage which indicates to which side of the center line between the closely spaced gates the video pulse lies. This direct voltage is used to bias reactance tube 22, which compensates the frequency of audio oscillator 10 until that frequency is the reciprocal of the delay time of the delay line 16.

Suppose, now, that the frequency of oscillator 10 is exactly equal to the reciprocal of the delay time of delay line 16. A trigger from differentiating circuit 11 initiates the double gate generator 21. For purposes of this illustration, it may be assumed that the first gate is initiated by the leading edge of the trigger and the second gate is initiated by the trailing edge of the first gate. Suppose, also, that variable delay 12 is set for zero delay and that the video pulse from oscillator 13 has a leading edge coincident with the leading edge of the trigger from circuit 11. In the absence of any delay in the elements connecting oscillator 13 to coincidence circuit 20, with the exception, of course, of delay line 16, the leading edge of the video signal in the output of amplifier 19 would coincide with the leading edge of the first gate of double gate generator 21. However, as pointed out above, it is necessary to have the video signal centered about the center line between the two gates from generator 21 when the frequency of oscillator 10 is equal to the reciprocal of the delay of delay line 16, the assumed condition in this example. Therefore, delay 12 may be adjusted so that the combined delay of this circuit and the delays of the circuits from delay 12 to coincidence circuit 20 (previously assumed to be zero but which, in actual practice, may have a small finite value) are just sufficient to center the video signal on the center line of the gates from generator 21 when oscillator 10 is operating at its proper frequency. Except for the fact that it may be desirable to pass other signals through delay line 16 only and have them delayed by a time equal to the period of the signal from oscillator 10, the variable delay 12 could be incorporated in delay line 16.

Once variable delay 12 has been adjusted, any variation of the video signal from the center line of the gates will result in a signal being applied to reactance tube 22 that will correct the frequency of oscillator 10. That is, if the frequency of the oscillator increases so that the video signals fall within the first gate, the signal applied to the reactance tube 22 will be such that reactance tube will tend to reduce the frequency of oscillator 10. If, on the other hand, he frequency of the signal from oscillator 10 decreases slightly, the signal applied to reactance tube 22 will be such that reactance tube 22 will tend to increase the frequency of oscillator 10. The repetition rate of the oscillator is thus accurately determined by the delay line, thereby insuring superposition of successive signal patterns.

It is believed that the construction and operation of my invention, as well as the advantages thereof, will be apparent from the foregoing description. Although the present embodiment has been suggested for use in a moving target indication system, no limitations should be placed on the versatility of the invention. It will be understood that while I have shown and described my invention in a preferred form, changes may be made in the circuits disclosed without departing from the invention, as sought to be defined in the following claims.

What is claimed is:

1. A self-synchronization circuit comprising an oscillator, means producing a recurrent pulse signal at a frequency determined by the frequency of oscillation of said oscillator, gate generating means coupled to said pulse producing means, said gate generating means being adapted to produce a pair of adjacent gate signals, delay means coupled to said pulse producing means, error signal generating means coupled to said delay means and said gate generating means, said error signal generating means being adapted to provide a signal indicative of the time position of delayed pulses from said delay means with respect to the time of occurrence of said gate signals, and means responsive to said error signal generating means for controlling the frequency of said oscillator.

2. Apparatus for maintaining a predetermined relationship between the frequency of an oscillator and the delay time of a delay line, said apparatus comprising means coupled to said oscillator for producing a first series of pulses having a predetermined time relationship to the signal generated by said oscillator, variable delay means coupled to said pulse producing means, means coupling said delay means to said delay line, gate generating means coupled to said pulse producing means and adapted to produce a pair of adjacent gate signals in predetermined time relationship to said first series of pulses, a coincident circuit coupled to said delay line and said gate generating means, said coincidence circuit providing an output signal indicative of the time relationship of the delayed series of pulses from said delay line to said gate signals and frequency controlling means responsive to said output signal from said coincidence circuit for controlling the frequency of said oscillator whereby said predetermined relationship is maintained.

3. Apparatus for maintaining a predetermined relationship between the frequency of an oscillator and the delay time of a delay line, said apparatus comprising a pulse generating means coupled to said oscillator for producing a first series of pulses having a predetermined time relationship to the signal generated by said oscillator, a source of carrier frequency signals, a modulator coupled to said pulse generating means and said source of carrier frequency signals, said modulator being coupled to the input of said delay line, a detector coupled to the output of said delay line, gate generating means coupled to said pulse producing means and adapted to produce a pair of adjacent gate signals in predetermined time relationship to said first series of pulses, a coincidence circuit coupled to said detector and said gate generating means, said coincidence circuit providing an output signal indicative of the time relationship of the pulses in the output of said detector and said gate signals and a reactance tube circuit having its input coupled to said coincidence circuit and its output coupled to said oscillator for controlling the frequency of said oscillator.

4. A circuit for maintaining the frequency of an oscillator constant comprising, means coupled to said oscillator for generating recurrent pulse signals at a frequency determined by said oscillator, a coincidence circuit adapted to provide an output signal indicative of the time spacing between first and second inputs to said coincidence circuit, means coupled to said pulse generator for applying said pulse signals as a first input to said coincidence circuit with a delay in time at least as great as the reciprocal of the frequency at which said oscillator is to be maintained, means coupled to said generator for producing a series of pairs of adjacent gate signals in predetermined time relationship to said recurrent pulse signals, means for applying said gate signals to said coincidence circuit as a second input, and means coupled to said oscillator and responsive to the output of said coincidence circuit for controlling the frequency of said oscillator whereby the time relationship of said delayed signals and said gate signals is maintained substantially constant.

References Cited in the file of this patent

UNITED STATES PATENTS

| | | |
|---|---|---|
| 2,065,565 | Crosby | Dec. 29, 1936 |
| 2,104,801 | Hansell | Jan. 11, 1938 |
| 2,211,750 | Humby | Aug. 20, 1940 |
| 2,426,187 | Earp | Aug. 26, 1947 |
| 2,462,110 | Levy | Feb. 22, 1949 |
| 2,543,072 | Stearns | Feb. 27, 1951 |
| 2,646,510 | Musselman | July 21, 1953 |